May 19, 1970 R. H. GEST ET AL 3,513,474
COLLAPSIBLE HYPERBOLIC REFLECTOR FORMED OF SPACED WIRES
Filed Jan. 4, 1968 5 Sheets-Sheet 4

United States Patent Office 3,513,474
Patented May 19, 1970

3,513,474
COLLAPSIBLE HYPERBOLIC REFLECTOR FORMED OF SPACED WIRES
Robert H. Gest, Jean Fernand Bostyn, and Jean Martinet, Paris, France, assignors to CSF-Compagnie Generale de Telegraphie Sans Fil, a corporation of France
Filed Jan. 4, 1968, Ser. No. 695,737
Claims priority, application France, Jan. 9, 1967, 90,416; May 16, 1967, 106,516
Int. Cl. H01q 19/00, 15/20
U.S. Cl. 343—756                  6 Claims

ABSTRACT OF THE DISCLOSURE

An antenna assembly comprising a circular array of radiating elements and a reflector having the form of a surface of revolution, wherein the latter is built up by at least one assembly of metallic wires, the ends of which are attached to two circular plates or rings. The spacing between these plates or rings may be reduced, so that the antenna can be collapsed when not being used.

The invention relates to antennae, especially suitable as counter-rotational antennae for artificial satellites.

Electronic-scanning antennae of known type, used in satellites, are generally much too bulky in particular insofar as launching is concerned.

It is an object of the invention to avoid these drawbacks. To this end the reflector of the antenna has a variable geometry and is collapsed during the launching.

According to the invention there is provided an antenna having an axis of revolution comprising:

A collapsible reflector comprising two circular supports with variable spacing and at least one assembly of metal wires having ends respectively fixed to these two supports;

Means for spacing apart said supports for bringing the antenna into its working position, said wires forming in this position at least one hyperboloid of revolution about said axis, and An assembly of radiating elements mounted on a circle concentric with said axis of revolution.

For a better understanding of the invention reference will be made to the drawings accompanying the following description and in which.

In all figures, the same elements are shown under the same reference numerals.

Figure 1:
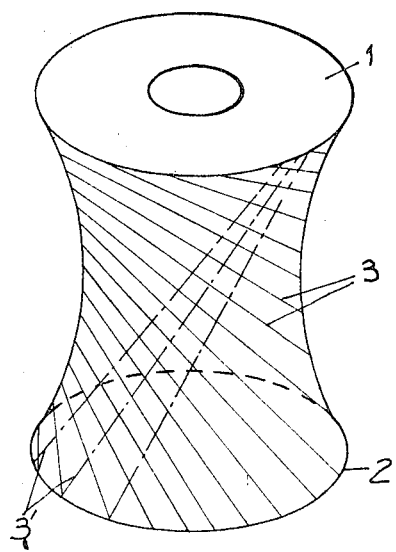
FIG. 1 shows the basic diagram of a reflector of an antenna according to the invention.

In FIG. 1 there is illustrated the basic principle of a reflector according to the invention in the unfolded state.

It comprises two metal platforms 1 and 2, the spacing between which is variable, and at least one network of metal wires 3.

It is known that the surface of an hyperboloid of revolution is a ruled surface and that two families of straight lines can be traced therein. Thus, the surface of a reflector in the shape of a hyperboloid of revolution can be formed by wires which form one of the families of generatrices. Every wire is fixed by its ends to the two platforms 1 and 2 respectively, thus forming a reflector having the shape of a hyperboloid of revolution.

In the case of FIG. 1, comprising a reflector with a single reflecting surface, two networks of crossed wires 3 and 3' are used, forming the two families of generatrices, in order to assure the total reflection of incident waves without regard to their polarity.

Figure 2:
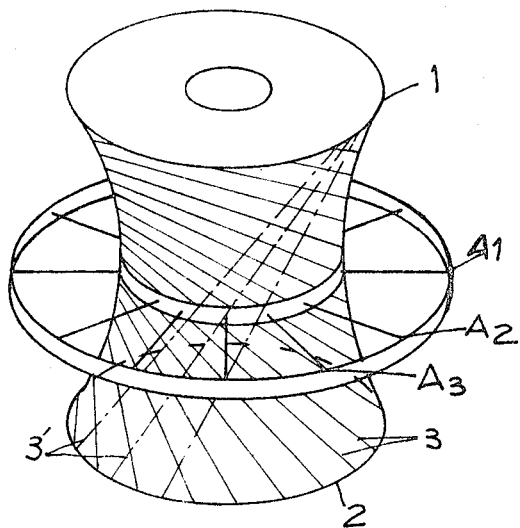
FIG. 2 shows the basic diagram of an antenna according to the invention.

FIG. 2 shows the antenna assembly according to the invention in the expanded position.

It comprises a reflector of the type shown in FIG. 1 and $n$ sources $A_1$, $A_2$, $A_3$ ... $A_n$, arranged on a circle. This circle is located in the plane of the foci of the hyperbolas, i.e. their equatorial plane and its diameter may be near that of the circle passing through the foci of the osculatory parabolas.

The waves coming from the sources are reflected in an isotropic manner by the double screen formed by the two networks of crossed wires 3 and 3', provided that the maximum spacing between the wires is less then $\lambda/10$, $\lambda$ being the operating wave.

Figure 3A:
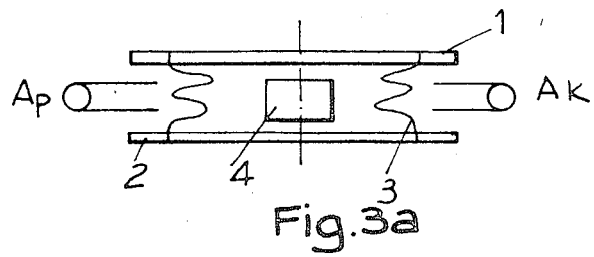
FIGS. 3a and 3b are diagrams of the antenna according to the invention respectively in the collapsed and in the operating conditions.
Figure 3B:
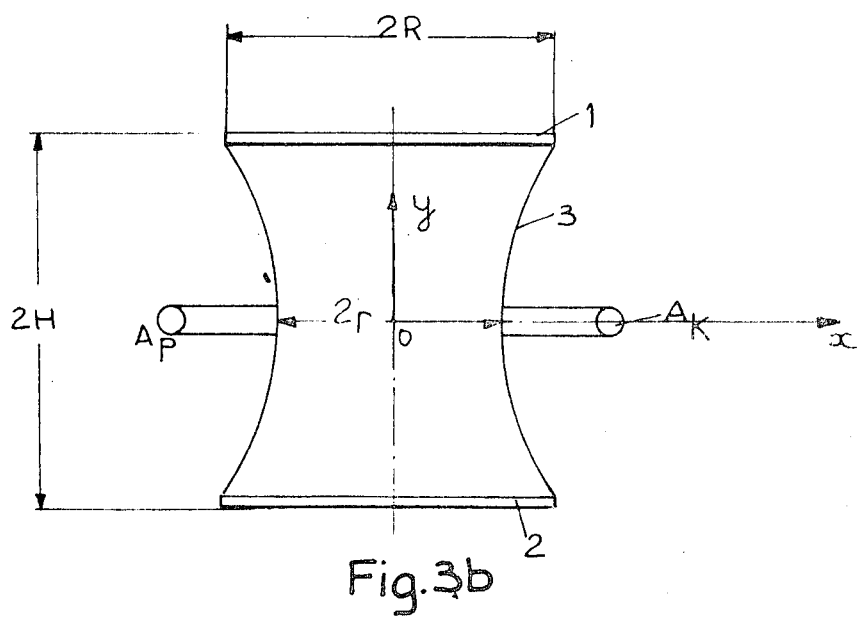

FIGS. 3a and 3b are diagrams, showing the variable geometry of the antenna according to the invention.

FIG. 3a shows the antenna in the folded state; the two metal platforms 1 and 2 are near each other and the metal wires of the network 3 are not tensioned. For the sake of clarity, this figure shows only the sources $A_p$ and $A_k$. The rectangle 4 designates the system for unfolding the antenna to place it into the operating state.

FIG. 3b shows the antenna in its normal operating condition corresponding to that of FIG. 2.

The two platforms 1 and 2 are in spaced relationship, and the network of metal wires (not shown in this drawing) is tensioned and builds up the reflector in the form of an hyperboloid of revolution of which only the external profile is shown.

Figure 4:
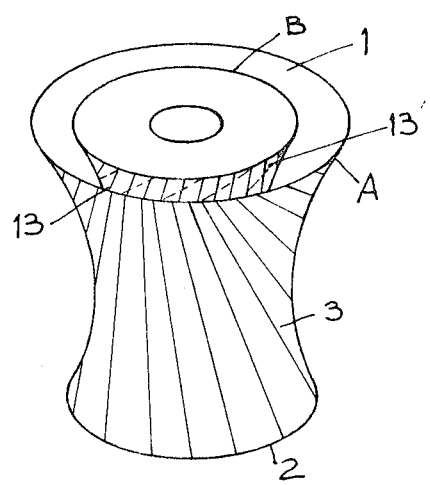
FIG. 4 shows a double reflector according to the invention.

FIG. 4 shows a double collapsible reflector according to the invention, permitting the total reflection of incident waves with possible change of their polarity.

In this case, two concentric hyperboloids of revolution A and B are formed between the two metal platforms 1 and 2.

The outer hyperboloid A comprises only one network of wires 3 or 3' (FIG. 1) and the inner hyperboloid B is formed by two networks 13 and 13' of crossed wires.

By selecting the spacing between the two hyperboloids and the characteristics of the networks, this reflector makes it possible to transform a wave with linear polarity into a wave with circular polarity, which is less sensitive to atmospheric conditions. The choice of the spacing of the wires will be explained further below with reference to FIGS. 9 to 15.

Figure 5:
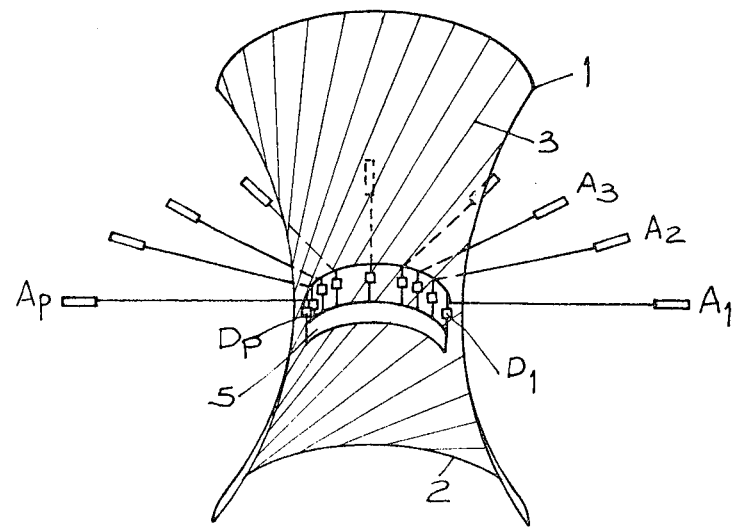
FIG. 5 shows in perspective a section through the meridian plane of the antenna according to the invention.

FIG. 5 shows in perspective a cross-section along a meridian plane of the antenna according to the invention in the unfolded state, together with an ultra-high frequency energy supply system.

The drawing shows again the metal platforms 1 and 2, the metal wires 3, and $n$ sources $A_1$, $A_2$, $A_3$ ... $A_n$.

The ultra-high frequency energy supply system comprises, as known per se, $n$ phase-shifters $D_1$, $D_2$, $D_3$ ... $D_n$, coupled on the one hand to the $n$ sources and on the other hand to a control and energy distributing circuit 5.

It is thus possible to obtain on a group of $p$ consecutive sources ($p$ being a whole number smaller than $n$) amongst the $n$ sources a given amplitude and phase distribution. The control and distribution circuit has as main object the displacement of this group of $p$ sources in a continuous manner along the $n$ sources during the rotation of the satellite so as to maintain the direction of the axis of the radiated beam constant.

Figure 6A:
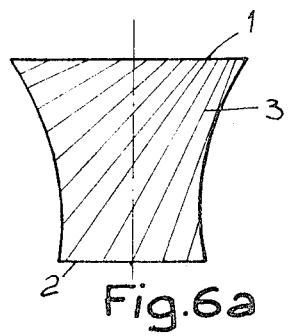
FIGS. 6a, 6b, 6c are diagrams of three embodiments of a reflector according to the invention.
Figure 6B:
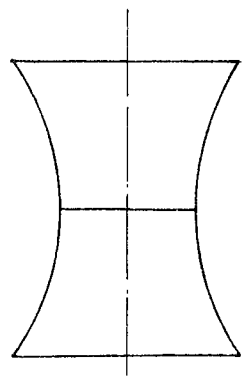
Figure 6C:
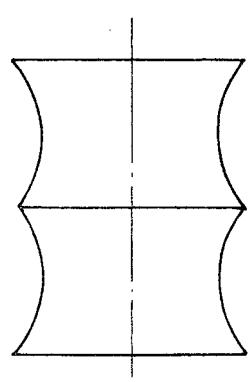

FIGS. 6a, 6b and 6c show several embodiments of the reflector according to the invention, given by way of non-restrictive examples.

In the case of FIG. 6a, the reflector is in the shape of a truncated hyperboloid in a dissymmetrical manner, and the sources are not intercepted by the reflected radiation.

It is also possible to assemble several sections of different hyperboloids in order to produce a reflector whose profile may be assimilated to an assembly of arcs of osculatory parabolas at one of the points of each hyperbola section.

One may then have either to draw together the wires, which tend to move away from the surface to be obtained, as is the case in FIG. 6b or to draw them apart as is the case in FIG. 6c.

Figure 7:
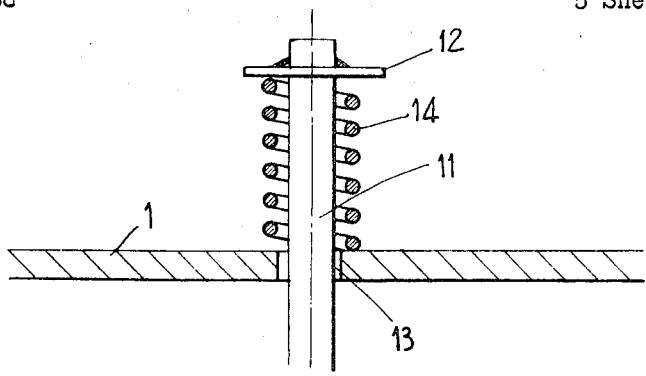
FIG. 7 shows an embodiment of a system for attaching the wires forming the reflector.

FIG. 7 shows an embodiment of the system for the attachment of the wires which form the reflector. The end 11 of a metal wire comprises a washer 12, the diameter of which is greater than that of a hole 13 formed in the platform 1, or 2; a spring 14 is placed between the upper face of the platform 1, or the lower side of platform 2, and the washer, the tensioning of the wire being thus assumed.

Figure 8:
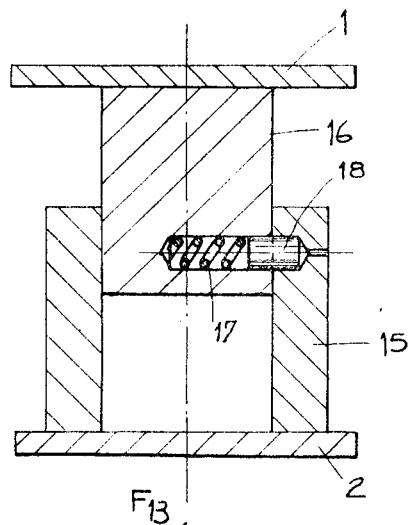
FIG. 8 shows diagrammatically an embodiment of the device for unfolding the reflector according to the invention.

FIG. 8 shows an embodiment of the device 4 for unfolding the reflector and maintaining it in the unfolded position.

In this embodiment, the unfolding is achieved by lighting a power or gas filled cartridge, placed in a cylinder 15, solid with one of the platforms and in which a piston, associated with the other platform, can move. A spring 17 and a ball or pin 18 associated with the piston ensure the holding of the platforms in the spaced-apart position, after the firing of the cartridge, by means of an automatic blocking arrangement.

FIGS. 9 to 15 set forth in greater detail the invention in the case of a polarity changing reflector as shown in FIG. 4.

To this end, in FIG. 3b, different parameters of a symmetrical hyperboloid section are indicated, to wit the radius $r$, the height $2H$ and the maximum radius $R$. The wires of the network 3 are inclined substantially at an angle of 45° on the direction of pollarization of the incident wave.

The characteristics (considering only the complex transmission and reflection coefficients of the network) depend on two parameters, the ratios $a/d$ and $a/\lambda$, and the characteristics of the assembly of two reflectors-essentially with regard to the polarity, the relative amplitudes, the components of the resulting wave and their relative phase-shift-depend, in addition, on the ratio $e/\lambda$, wherein $a$, $d$, $e$, are, respectfully, the spacing between two successive wires, the diameter of one wire, and the spacing between the two reflectors parallel to the direction of the propagation of the waves.

Figure 9:
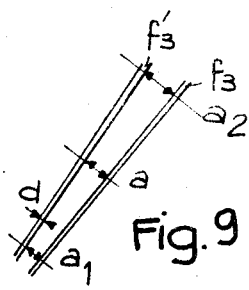
FIGS. 9 and 10 shows details of the reflector of FIG. 4.
Figure 10:
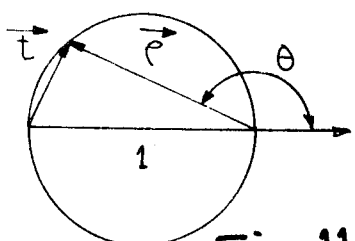

FIGS. 9 and 10 set forth these parameters.

FIG. 9 shows two successive wires $f_3$ and $f'_3$ of the network 3. The spacing to be considered must be measured perpendicularly to the wires for a flat network. In a hyperboloid, the wires are neither concurrent nor parallel and $a$ which is the shortest distance between the wires at the point under review, will be measured in practice with a rule.

It may be seen that $a$ varies along the wire. At the end, if $2R$ is the maximum diameter of the circle which the wires contact, $a = a_2 = K_2(2\pi R - nd)$, $n$ being the number of wires, and in the centre $a = a_1 = K_1(2\pi r - nd)$, where $K_1$ and $K_2$ are coefficients which are a function of the direction along which $a$ has been measured.

It follows therefrom that:

$$a_2/a_1 = \frac{K_2}{K_1} \cdot \frac{2\pi R - nd}{2\pi r - nd}$$

which is of the order of magnitude of $R/r$, with $nd$ negligible relative to $2\pi r$ and $K_2/K_1 \simeq 1$.

FIG. 10 sets forth the variations along a wire of the distance $e$ between the two reflectors $F_3$ and $F_{13}$ represent partially the contours of the hyperboloids and the distance $e$ is measured perpendicularly to the rear reflector. The distance $e$ varies therefore along a wire, as extreme values $r_2 - r_1$ and $k(R_2 - R_1)$, where $r_1$, $r_2$, $R_1$, $R_2$ are, respectively, the values of $r$ and $R$ for the two reflectors, and $k$ is a coefficient which depends on the direction of the tangent at the end of the rear reflector. In practice, $k$ is of the order of $$\frac{\sqrt{2}}{2}$$

The ratio $a/d$ increases from the centre towards the ends of a hyperboloidal section and the reflection coefficient of the network 3 decreases in the same way. The theory of networks shows that, in order to preserve the same phase-shift between the components of the resulting wave, it is necessary to move the primary network away from the reflector network: the variation of $e$ is therefore favourable for a good operation.

Figure 11:
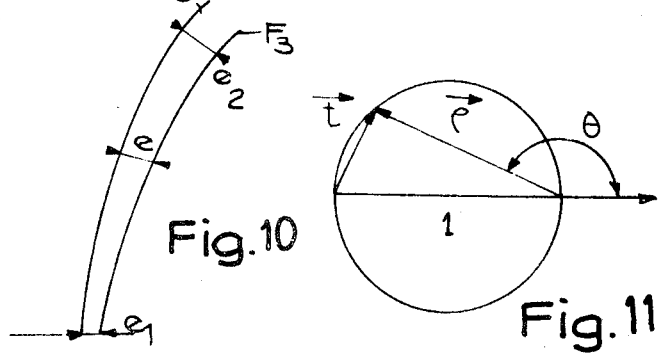
FIGS. 11, 12 and 13 are explanatory diagrams.
Figure 12:
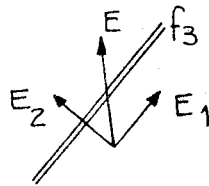
Figure 13:
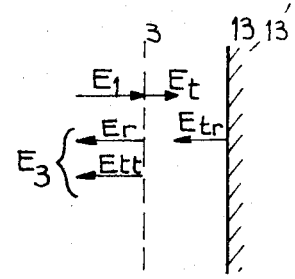

FIGS. 11, 12 and 13 are diagrams relating to the functioning of a reflector comprising a network with large spaces between the wires followed by a total reflector at the distance $a$.

FIG. 11 shows the vectors $\vec{p}$ and $\vec{t}$ representing the reflection and transmission coefficients of the network 3 and $\theta$ their relative phase-shift which varies between 90° and 180°.

$$\vec{p} = re^{j\theta}$$

and $$\vec{t} = |t|e^{j(\theta - \pi/2)}$$

The diagram of FIG. 8 shows the curves for $$r = |\rho| = \text{constant}$$

with $a/\lambda$ plotted along the ordinates and $a/d$ along the abscissae. It can be seen that for $a/d \geqslant 10$ and $a \leqslant 0.8$, $r$ is connected to $\theta$ by the relation $r \neq -\cos \theta$.

If $E$, $E_1$ and $E_2$ are, respectively, the electric fields of the incident wave and of its components perpendicularly and parallel to the wires of the network, the wave $E_2$ passes through the network 3, is reflected from the networks 13, 13' and, on its return to the wire, undergoes a phase shift $2\varphi + \pi$ with $$\varphi = \frac{2\pi e}{\lambda}$$

After partial transmission by the network 3 as $Et_1$, reflection on network 13, 13' as $Etr$, partial retransmission by the network 3 as $Ett$ and partial reflection thereby as $Er$, the component $E_1$ gives rise to a component $E_3$ (FIG. 13) so that:

$$\frac{E_3}{E_1} = e^{j\theta}\frac{1 + re^{j(2\varphi - \theta)}}{1 + e^{j(2\varphi - \theta)}} = e^{j(\theta + \psi_1 - \psi_2)}$$

which leads $E_1$ by the phase $$\theta + \psi_1 - \psi_2$$

Thus, the total phase shift between the components of the resulting wave parallel and perpendicularly to the wires is:

$$\Delta\Phi = 2\varphi + \pi + \theta + \psi - \psi_2$$

where $\Delta\Phi$, $\varphi$, $\theta$ are linked by the relation $$tg\frac{\Delta\Phi}{2}=\frac{1-\cos 2\varphi}{\sin 2\varphi - tg\theta}$$

Figure 15:
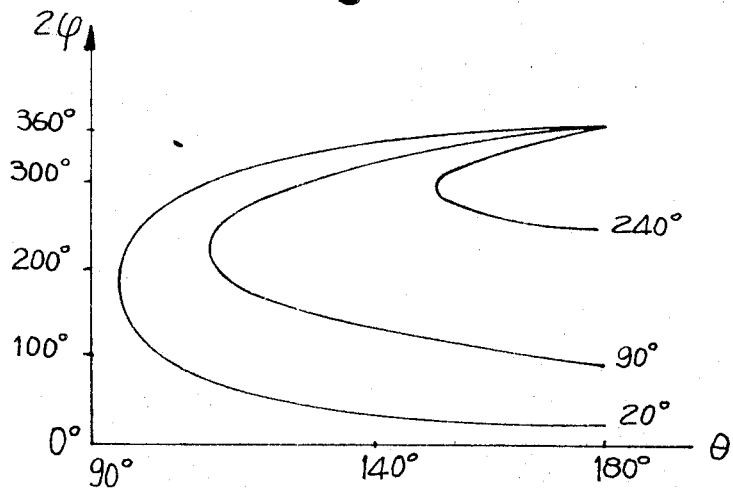

The diagram in FIG. 15 shows the curves with $\Delta\Phi$=constant with $\theta$ along the abscissae and $2\varphi$ on along the ordinates, with $$2\varphi=\frac{4\pi e}{\lambda}$$

and $\cos\theta$ # arc cos $(-r)$ linked with $a$, $d$ and $\lambda$ by the curves in FIG. 8.

If it is desired, for example, to obtain circular polarization, the parameters of the network 3 on the one hand and of the networks 13 and 13' on the other hand will be so chosen that along the curve, whilst $a$ and $e$ vary, the operating point moves on the curve $\Delta\Phi=90°$ (components of the squared wave).

By way of example, the calculation in a particular case is as follows:

The coordinate axes are the axes $Ox$ and $Oy$ of FIG. 3b, and a start is made from three meridian points of the network, equally spaced thereon, e.g., the points:

(1): $x=11:03$ mm.; $y=12$ mm.
(2): $x=15.58$ mm.; $y=18$ mm.
(3): $x=21.1$ mm.; $y=24$ mm.

The diameter of the wire is chosen to be 4/10 mm. and the spacing between the wires at the point (1) is made equal to 8.5 mm. According to the relation $a_1/a_2=r/R$, one has at points (2) and (3):

$$a_2=12 \text{ mm.}$$
$$a_3=17 \text{ mm.}$$

Figure 14:
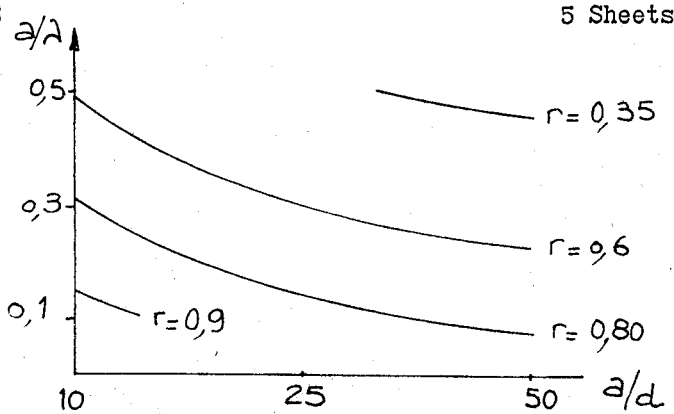
FIGS. 14 and 15 are explanatory diagrams.

It is therefore possible to calculate the values of $a/d$ and $a/\lambda$, for $\lambda=7.5$ cm.:

$a_1/d=21.25$     $a_1/\lambda=0.113$
$a_2/d=30$     $a_2/\lambda=0.16$
$a_3/\lambda=42.5$     $a_3/\lambda=0.23$ Referring to the curves in FIGS. 14 and 15, it is found for each point that:

| Points | (1) | (2) | (3) |
|---|---|---|---|
| r | 0.91 | 0.81 | 0.63 |
| $\theta°$ | 156 | 144 | 129 |
| $2\varphi°$ | 110 | 122 | 145 |
| $e/\lambda$ | 0.153 | 0.17 | 0.20 |
| emm | 11.5 | 12.7 | 15.1 |

From these values it is possible to calculate the coordinates of points (1'), (2') and (3') on the second reflector, and the calculate the equation of the hyperbola passing through these points.

This hyperbola forms by revolution a hyperboloid.

It can be seen a posteriori that for the intermediate points on the surface, the condition $\Delta\Phi=90°$ is substantially fulfilled.

Each reflector 3 or 13, 13' may be formed by several networks, forming several sections of hyperboloids, whether symmetrical or not, which has the dual advantage of realizing as in the case of the total reflector of FIG. 1, a better approximation of the desired theoretical surface, whose meridian is a parabola, and to permit to remain with better accuracy of the constant $\Delta\varphi$ curve. It might also be of interest to render the sources excentric to avoid the shadow of the sources in the resulting radiation.

Of course, the invention is not limited to the embodiments hereinbefore described and shown which were given merely by way of non-limiting examples.

More particularly, the plane of the sources 4 is not necessarily in the equatorial plane and their positions in this plane will depend mainly on the number of arcs forming the hyperboloid. This number will again be a function of various mechanical and electronic parameters (required accuracy, dimensions, acceptable complexity, etc.).

What is claimed is:
1. An antenna having an axis of revolution comprising:
   a collapsible reflector comprising two circular supports with variable spacing and at least one assembly of metal wires having ends respectively fixed to these two supports;
   means for spacing apart said supports for bringing the antenna into its working position, said wires forming in this position at least one hyperboloid of revolution about said axis;
   and an assembly of radiating elements mounted on a circle concentric with said axis of revolution.
2. An antenna according to claim 1, wherein said wires build up a plurality of superimposed hyperboloids.
3. An antenna according to claim, wherein, said reflector, including only one reflecting surface, comprises two assemblies of wires which are respectively the two generatrices of the same revolution.
4. An antenna according to claim 1, wherein, said reflector including two concentrical reflecting surfaces, comprises a first assembly of wires which are first generatrices of a first hyperboloid, and a second and a third assembly of wires which are the two generatrices of a second hyperboloid coaxial with said first hyperboloid.
5. An antenna according to claim 4, wherein the wires of said first assembly are spaced apart from each other by more than $\lambda/10$, where $\lambda$ is the operating wavelength.
6. An antenna according to claim 4, wherein each reflecting surface forms a truncated hyperboloid.

References Cited
UNITED STATES PATENTS 2,747,183    9/1969    Edwards _____ 343—896

ELI LIEBERMAN, Primary Examiner

U.S. Cl. X.R.
343—835, 840, 915